(12) United States Patent
Do (10) Patent No.: US 9,860,416 B2
(45) Date of Patent: Jan. 2, 2018

(54) APPARATUS AND METHOD FOR PROCESSING IMAGE DATA WITH MULTIPLE FLIP-FLOP STORAGES

(71) Applicant: KYOCERA Document Solutions Inc., Osaka (JP)

(72) Inventor: Thien-Phuc Nguyen Do, El Segundo, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/451,552

(22) Filed: Mar. 7, 2017

(65) Prior Publication Data

US 2017/0180594 A1    Jun. 22, 2017

Related U.S. Application Data

(62) Division of application No. 14/575,610, filed on Dec. 18, 2014, now Pat. No. 9,641,721.

(51) Int. Cl.
| | |
|---|---|
| *H04N 1/00* | (2006.01) |
| *H04N 1/32* | (2006.01) |
| *H04N 1/41* | (2006.01) |
| *G06F 3/12* | (2006.01) |

(52) U.S. Cl.
CPC ....... *H04N 1/32459* (2013.01); *G06F 3/1221* (2013.01); *H04N 1/41* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,805,482 A | 9/1998 | Phillips | |
| 6,298,142 B1* | 10/2001 | Nakano | G06T 1/0021 375/E7.026 |
| 2004/0160625 A1* | 8/2004 | Kondo | H04N 1/00068 358/1.15 |
| 2006/0222245 A1* | 10/2006 | Sakai | H04N 19/60 382/232 |
| 2009/0092330 A1* | 4/2009 | Koroteev | H04N 19/176 382/251 |

(Continued)

OTHER PUBLICATIONS

International Telecommunication Union, CCITT Terminal Equipment and Protocols for Telematic Services, Information Technology—Digital Compression and Coding of Continuous-Tone Still Images—Requirements and Guidelines, Recommendation T.81, Sep. 18, 1992.

*Primary Examiner* — Henok A Shiferaw
(74) *Attorney, Agent, or Firm* — McDonnell Boehnen Hulbert & Berghoff LLP (57) ABSTRACT

An image processing system includes a first flip-flop bank and a second flip-flop bank, and a control system configured to control JPEG processing of image data. The control system is further configured to, during a first period, use one of the first or second flip-flop banks as a write bank and the other of the first or second flip-flop banks as a read bank and, during a second period, alternate the use of the first and second flip-flop banks as the write bank and the read bank. Further, the control system is configured to, after alternating the use, initialize the read bank to zero.

13 Claims, 6 Drawing Sheets

(56) References Cited

U.S. PATENT DOCUMENTS

| | | | |
|---|---|---|---|
| 2010/0092099 A1* | 4/2010 | Richter | H04N 19/129 382/244 |
| 2011/0080946 A1* | 4/2011 | Li | H03M 7/40 375/240.03 |
| 2013/0259396 A1* | 10/2013 | Hayashi | G06T 9/00 382/251 |

* cited by examiner

APPARATUS AND METHOD FOR PROCESSING IMAGE DATA WITH MULTIPLE FLIP-FLOP STORAGES

RELATED PRIORITY APPLICATION

This application is a divisional of and claims priority to U.S. patent application Ser. No. 14/575,610, the entirety of which is incorporated by reference herein.

BACKGROUND

In recent years, various types of printing devices have become popular for both business and consumer use. In addition to traditional black and white printers, color printers, scanners, copiers, fax machines, and other components are now common. Multi-function peripherals (MFPs), that support two or more of these functions, are also widely available. Among other functions, these devices are used to process image data.

The processing of image data may include, for instance, compressing and encoding the image data, and/or decompressing and decoding the image data. One example image processing technology is Joint Photographic Experts Group (JPEG). Generally, a JPEG encoding process of image data includes spatial frequency conversion, quantization, data sequencing, and entropy encoding, and a JPEG decoding process of image data generally includes an inverse of the JPEG encoding processes.

It is desirable to improve on the arrangements of the prior art or at least to provide one or more useful alternatives to help to make image data processing more power efficient and faster.

SUMMARY

In an example embodiment, a method for processing image data includes, during a first period, encoding contents of a first flip-flop storage component to produce first encoded data for first image data. In this example, the contents of the first flip-flop storage component include a first set of one or more quantized frequency coefficients that correspond to the first image data and that are ordered in a predetermined sequence. Further, the method includes, during the first period, storing a second set of one or more quantized frequency coefficients that are ordered in the predetermined sequence in a second flip-flop storage component. In this example, the second set of one or more quantized frequency coefficients correspond to second image data. The method also includes, after encoding the contents of the first flip-flop storage component and storing the second set of one or more quantized frequency coefficients in the second flip-flop storage component, setting the contents of the first flip-flop storage component to zero. This example also includes, during a second period after the first period, encoding contents of the second flip-flop storage component to produce second encoded data for the second image data. The contents of the second flip-flop storage component include the second set of one or more quantized frequency coefficients stored during the first period. In addition, during the second period, the method includes storing a third set of one or more quantized frequency coefficients that are ordered in a predetermined sequence in the first flip-flop storage component. The third set of one or more quantized frequency coefficients correspond to third image data.

In another example embodiment, a method for processing image data includes, during a first period, performing an inverse spatial frequency conversion on contents of a first flip-flop storage component to produce first image data. In this example, the contents of the first flip-flop storage component include a first set of one or more frequency coefficients that represent a spatial frequency conversion of the first image data. Further, the method includes, during the first period, storing a second set of one or more frequency coefficients in a second flip-flop storage component. In this example, the second set of one or more frequency coefficients represent a spatial frequency conversion of second image data. The method also includes, after performing an inverse spatial frequency conversion on contents of the first flip-flop storage component and storing the second set of one or more frequency coefficients in the second flip-flop storage component, setting the contents of the first flip-flop storage component to zero. In addition, during a second period after the first period, the method includes performing inverse spatial frequency conversion on contents of the second flip-flop storage component to produce the second image data. The contents of the second flip-flop storage component include the second set of one or more frequency coefficients stored during the first period. Further, during the second period, the method includes storing a third set of one or more frequency coefficients in the first flip-flop storage component. The third set of one or more frequency coefficients represent a spatial frequency conversion of third image data.

In a further example embodiment, an image processing system includes a first flip-flop bank and a second flip-flop bank and a control system configured to control JPEG processing of image data. In this example, the control system is further configured to, during a first period, use one of the first or second flip-flop banks as a write bank and the other of the first or second flip-flop banks as a read bank, and during a second period, alternate the use of the first and second flip-flop banks as the write bank and the read bank. The control system is also configured to, after alternating the use, initialize the read bank to zero.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION OF THE DRAWINGS

Example methods and systems are described herein. Other example embodiments or features may further be utilized, and other changes may be made, without departing from the spirit or scope of the subject matter presented herein. In the following detailed description, reference is made to the accompanying figures, which form a part thereof.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Introduction

Printing technology has evolved over the last 30-plus years from simple dot-matrix-based output devices producing only black and white images to today's advanced laser-based printing devices that can produce high-resolution color images. Additionally, modern printing devices may also function as copiers, scanners, and fax machines. To do so, they may be able to store image data for numerous electronic documents that are queued for printing or faxing, or that have been scanned. Thus, many printing devices are specialized forms of computing devices that may include, for example, one or more processors, data storage, and input/output interfaces.

Regardless of whether a printing device is used in a residence, a business, or in another type of location, the printing device may be a shared resource that can be communicatively coupled to various other computing devices. Consequently, in some environments, the storage and processing requirements of a printing device may be quite high, as numerous computing devices may be transmitting electronic documents to the printing device for printing. Typically, a printing device will print, copy, fax, and/or scan one electronic document at a time, in a first-come-first-served fashion. Therefore, the printing device may store a potentially large number of electronic documents that are waiting to be serviced. Since the cost of data storage (e.g., memory such as random access memory (RAM), solid-state memory, hard-drive memory, and/or flash memory) can be expensive, it may be beneficial to compress the stored electronic documents, in order to reduce the data storage requirements of the printing device. Additionally, since some electronic documents may be transferred to and/or from the printing device and a computing device, compressing these electronic documents may make transfers faster and use less network capacity.

Moreover, since print jobs may be large (e.g., a print job may include one or more electronic documents encompassing hundreds of pages), compressing queued print jobs in the queue saves short-term storage space before each job is printed. In addition, users may want to save print jobs in long-term storage for printing at a later time. Thus, compressing print jobs may allow more print jobs to be saved. Furthermore, the act of storing and retrieving large print jobs from long-term memory can be slow, but it may be expedited by compressing the print jobs to make them smaller in size.

2. Example Printing Device

Figure 1:
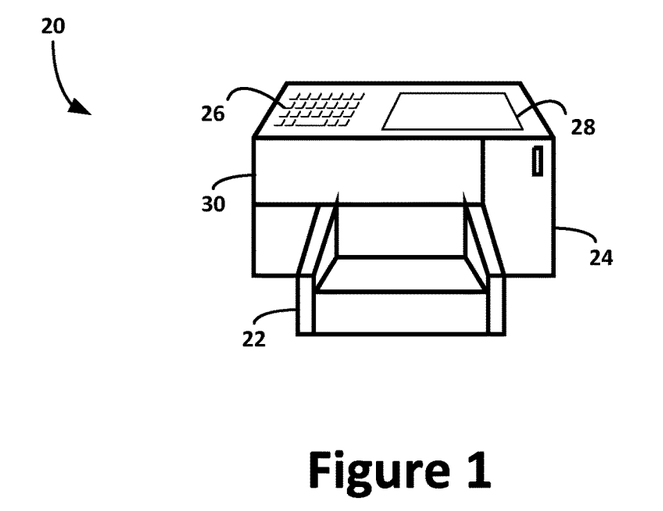
FIG. 1 depicts a printing device, according to an example embodiment.

FIG. 1 depicts an example printing device 20. Printing device 20 may be configured to print partially-stored and/or fully-stored electronic documents on various types of physical output media. These output media include, but are not limited to, various sizes and types of paper, overhead transparencies, and so on. Printing device 20 may be interchangeably referred to as a "printer."

Printing device 20 may serve as local peripheral to another computing device, such as a personal computer, a server device, a print server, etc. In these cases, printing device 20 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic documents for printing device 20.

On the other hand, printing device 20 may include a wireline or wireless network interface, such as an Ethernet or 802.11 (Wife) interface. So arranged, printing device 20 may serve as a printing device for any number of computing devices that can communicate with printing device 20 over a network. In some embodiments, printing device 20 may serve as both a local peripheral and a networked printer at the same time. In order to use printing device 20, computing devices may install one or more printer drivers. These printer drivers may include software components that convert the image data representing electronic documents to be printed from various local representations stored on the computing devices to one or more representations supported by printing device 20. Regardless, printing device 20 may be considered to be a computing device, and may carry out both printing-related and non-printing related tasks.

As noted above, printing device 20 may also include copier, fax, and scanner functions. In some embodiments, printing device 20 may use a scanner function to facilitate copier and/or fax functions. For instance, printing device 20 may scan a physical document into an electronic format, and then print the resulting electronic document to provide a copy, and/or transmit the resulting electronic document via a telephone interface to provide a fax function.

In order to support its various functions, printing device 20 may include a document feeder/output tray 22, paper storage 24, user interface 26, scanning element 28, and chassis 30. It should be understood that printing devices may take on a wide variety of forms. Therefore printing device 20 may include more or fewer components than depicted in FIG. 1, and/or components arranged in a different fashion than depicted in FIG. 1.

Document feeder/output tray 22 may hold physical documents (e.g., a stack of one or more sheets of paper) that are to be scanned, copied or faxed. Document feeder/output tray 22 may allow printing device 20 to automatically feed multiple physical documents for processing by printing device 20 without requiring manual intervention. Document feeder/output tray 22 may also include one or more separate output trays for holding physical documents that have been processed by printing device 20. These may include physical documents that have been scanned, copied or faxed by printing device 20, as well as physical documents that have been produced by, e.g., the fax and/or copying functions of printing device 20.

Paper storage 24 may include trays and/or feeding elements for various types of physical media. For instance, paper storage 24 may include separate trays for 8½×11 inch paper, A4 paper, letterhead paper, envelopes, and so on. For any function of printing device 20 that involves producing physical media (e.g., printing, copying, and/or receiving a fax), paper storage 24 may supply the physical media.

User interface 26 may facilitate the interaction of printing device 20 with a human or non-human user, such as to receive input from a user and to provide output to the user. Thus, user interface 26 may include input components such as a keypad, keyboard, touch-sensitive or presence-sensitive panel, joystick, microphone, still camera and/or video camera. User interface 26 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 26 may also be configured to be able to generate audible output(s), via a speaker, speaker jack, audio output port, audio output device, earphones, and/or other similar devices, now known or later developed in the future.

Scanning element 28 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with printing device 20.

Chassis 30 may include a physical housing that contains and or interconnects various components of printing device 20, such as document feeder/output tray 22, paper storage 24, user interface 26, and scanning element 28. Additionally, chassis 30 may house other components not shown in FIG. 1. For example, chassis 30 may contain one or more toner cartridges, liquid ink jets, belts, rollers, and/or power supplies. Further, chassis 30 may include communication interfaces, such as a wireline and/or wireless network interfaces, a telephony interface (e.g., a RJ45 jack), a USB interface, a BLUETOOTH® interface, a card reader port, etc.

Moreover, as printing device 20 may be based on general-purpose and/or specially-designed computing device components, chassis 30 may also house some or all of these components. For instance, the printing device 20 may include a processor and data storage (not explicitly shown). Generally, the processor may include one or more central processing units (CPUs), such as one or more general purpose processors and/or one or more dedicated processors (e.g., application specific integrated circuits (ASICs) or digital signal processors (DSPs), etc.). The data storage may include volatile and/or non-volatile data storage and can be integrated in whole or in part with processor. The data storage may store program instructions, executable by processor, and data that are manipulated by these instructions to carry out the various methods, processes, or functions described herein. Alternatively, these methods, processes, or functions can be defined by hardware, firmware, and/or any combination of hardware, firmware and software. Therefore, the data storage may include a tangible, non-transitory computer-readable medium, having stored thereon program instructions that, upon execution by one or more processors, cause printing device 20 to carry out any of the methods, processes, or functions disclosed in this specification or the accompanying drawings.

Further, the components of the printing device 20 may also include hardware and/or software components for compressing/encoding and/or decompressing/decoding image data.

3. Example Image Data Encoder and Decoder

Figure 2A:
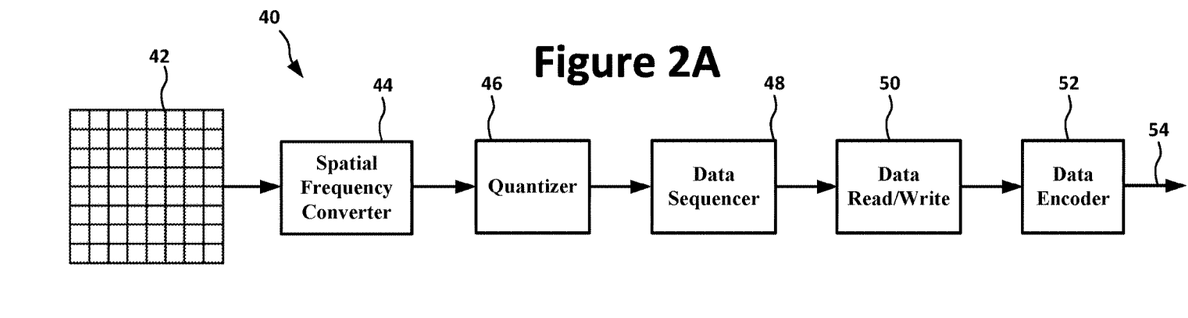
FIG. 2A is a block diagram illustrating image processing components of a printing device, according to an example embodiment.
Figure 2B:
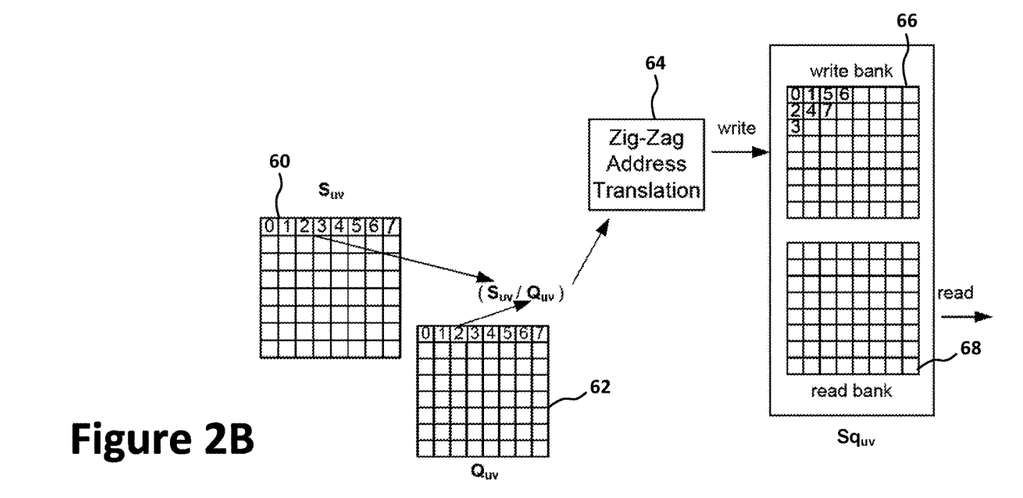
FIG. 2B is a block diagram illustrating storage components and data for use in image processing, according to an example embodiment.
Figure 4A:
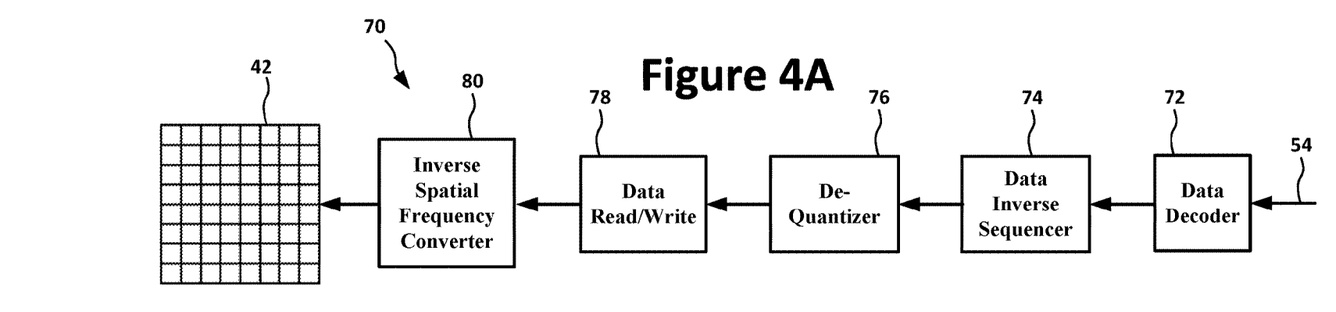
FIG. 4A is a block diagram illustrating image processing components of a printing device, according to an example embodiment.

FIGS. 2A and 4A depict example embodiments of computing device components (e.g., functional elements of a computing device) that may be included in printing device 20. Referring first to FIG. 2A, an example image data encoder 40 is illustrated. The encoder 40 is configured to receive image data 42. In the illustrated example, the image data is divided into image data blocks (e.g., 8×8 pixel blocks), and the image data blocks are provided to a spatial frequency converter 44 of the encoder 40. The spatial frequency converter performs spatial frequency conversion, such as by executing a discrete cosine transform (DCT) on the image data. Performing the spatial frequency conversion on the image data results in a set of one or more frequency coefficients that represent the spatial frequency conversion of the image data block. In the example of an 8×8 pixel block, the spatial frequency converter 44 is configured to produce between one and sixty-four frequency coefficients in a single clock cycle. Referring to FIG. 2B, in one example, these resulting frequency coefficients $S_{uv}$ may be stored in a storage component 60. In another example, a resulting set of one to sixty-four frequency coefficients $S_{uv}$ need not be stored separately, but are operated upon in a single operation (e.g., a single clock cycle) by a quantizer, data sequencer, and data read/write block, as will be described in more detail hereinafter.

For instance, the set of one to sixty-four frequency coefficients may then be immediately operated upon by a quantizer 46. The quantizer 46 generates quantized data, such as a set of one or more quantized frequency coefficients. Generally, quantization is a process for reducing or eliminating high frequency components after the image data has been transformed into the frequency domain by the spatial frequency conversion operation. The quantizer 46 operates on the frequency coefficients using a quantization table that includes quantization factors. More particularly, in the encoder 40, the quantizer divides the frequency coefficients $S_{uv}$ by corresponding quantization factors to generate the set of quantized frequency coefficients. FIG. 2B illustrates an example where the quantization factors $Q_{uv}$ may be stored in a storage component 62 or otherwise made available as inputs to the quantizer where one or up to sixty-four quantization factors $Q_{uv}$ are available per clock cycle. The quantizer 46 may also round the result of the division operation to eliminate insignificant high frequency components.

Figure 3:
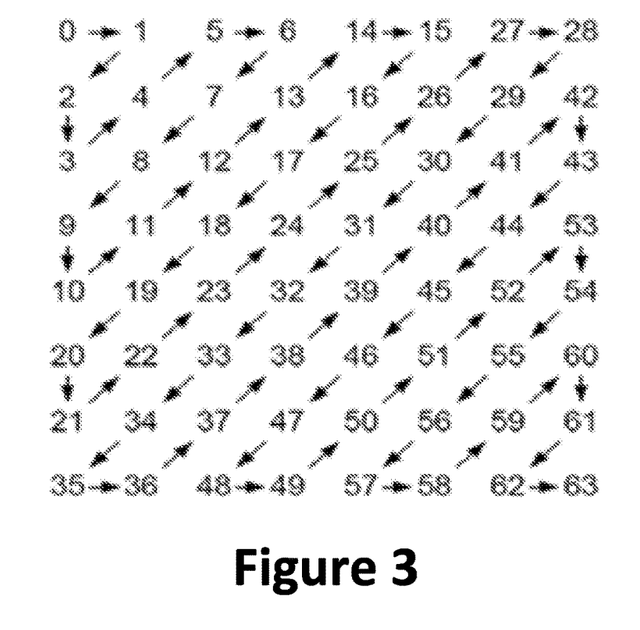
FIG. 3 is an example of a predetermined data sequence for an 8×8 data block.

In the present example, the set of quantized frequency coefficients $Sq_{uv}$ produced by the quantizer 46 may then be provided immediately, in a single operation or single clock cycle, to a data sequencer 48. The data sequencer 48 is configured to arrange the set of quantized frequency coefficients in a predetermined sequence. One such sequence is a zig-zag sequence that is illustrated by FIG. 3. FIG. 2B also illustrates a block 64 that represents the zig-zag sequencing operation.

Following the data sequencer 48, a data read/write block 50 is provided to write the quantized frequency coefficients $Sq_{uv}$ into a "write" storage component or bank. Similarly to the frequency coefficients $S_{uv}$ being scalable between one and sixty-four coefficients (e.g., for an 8×8 pixel block), the number of quantized frequency coefficients $Sq_{uv}$ written by block 50 during a single clock cycle is also scalable between one and sixty-four coefficients depending upon the processing speed of the components 44, 46, and 48.

Concurrently with the write function, the read/write block 50 may also read or extract the contents of another "read" storage component or bank, and provide the extracted contents to a data encoder 52. The write speed and the read speed of block 50 can be totally independent. Assuming that the current image data block is not the first data block of the image data that is being processed, the extracted contents of the read storage component include a previously stored or written set of quantized frequency coefficients $Sq_{uv}$. The data encoder 52 performs entropy or Huffman coding on the extracted, quantized frequency coefficients $Sq_{uv}$ to provide encoded data 54 for storage, transfer, or other processing. The read function of block 50 and the coding function of encoder 52 can be performed, per clock cycle, using a scalable number of previously stored quantized frequency coefficients $Sq_{uv}$ (e.g., one to sixty-four coefficients) to provide a corresponding scalable number of symbols of the encoded data 54 depending on the processing speed of the encoder.

Figure 7:
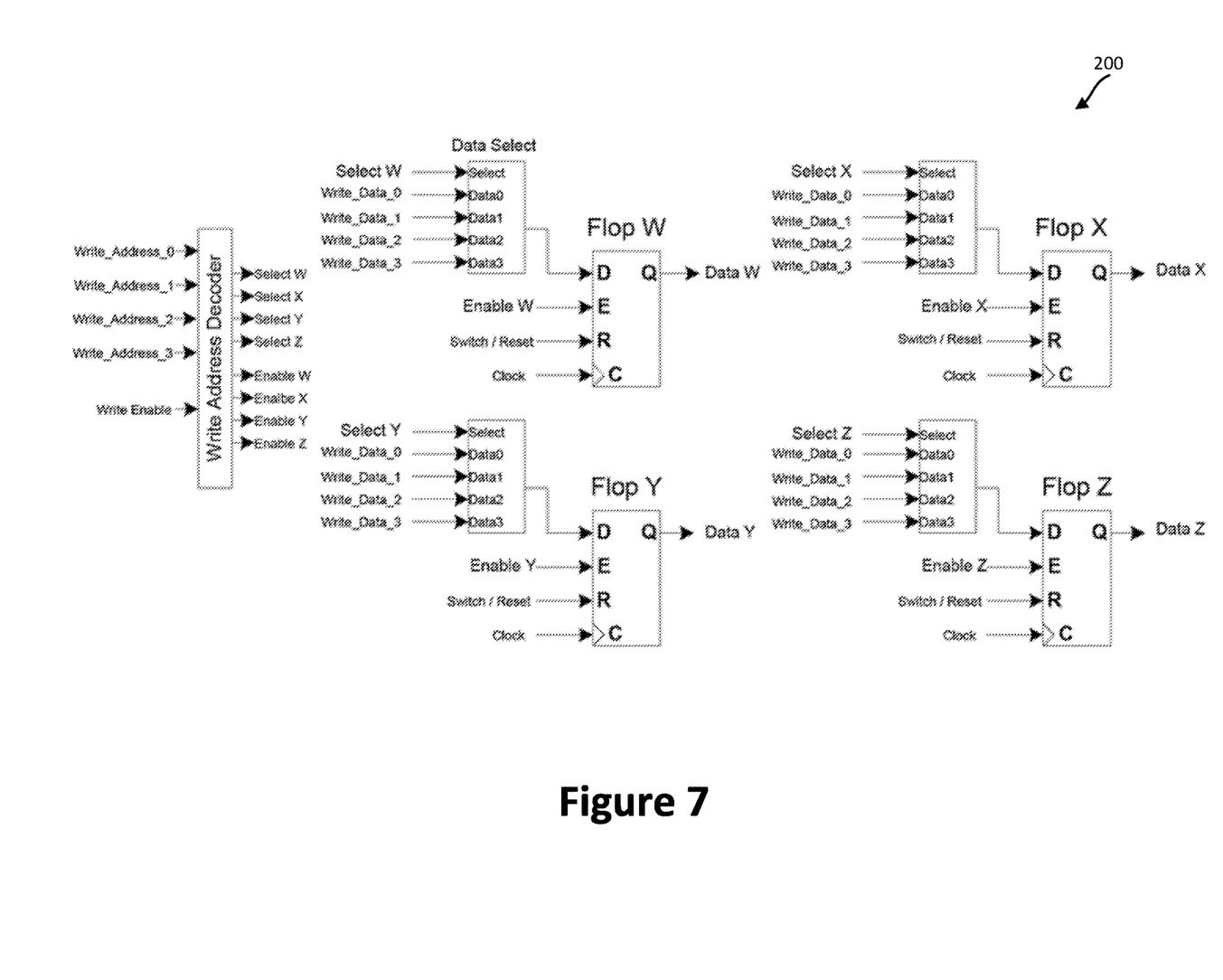
FIG. 7 is a block diagram of an example storage component for use in various embodiments of the present disclosure.

FIG. 2B illustrates two storage components 66, 68 that function as the write/read storage banks. In the present example, each of the storage components 66, 68 is a scalable N×M flip-flop storage structure (N and M being integers). The storage components 60, 62 may also be N×M flip-flop storage structures. An example, scalable 2×2 flip-flop storage structure or bank is illustrated in FIG. 7, and will be described in more detail hereinafter.

Generally, the flip-flop storage structure provides various benefits over SRAM storage structures that are typically used as the storage components for image data processing. For instance, writing data to a desired cell of an SRAM storage structure typically requires accessing a particular row of the storage structure and performing a read-modified-write process to access and write to the desired cell in the row. Further, the number of ports of the SRAM storage structure limits the number of rows that can be accessed at the same time (e.g., during a single clock cycle), and thus, the number of cells that can be written to (or read from) simultaneously. SRAMs may commonly have a single or dual port, although, highly customized, and relatively expensive, SRAMs may have a greater number of ports. The present embodiment uses flip-flop storage structures that are easily (and relatively inexpensively) scalable in size and that can be used to write to and read from any cell of any row simultaneously during a single clock cycle, which provides a potentially much higher data rate than would be possible with typical SRAMs. Further, the flip-flop storage structures used herein can be selectively reset or set or zero during a single clock cycle, which may provide additional benefits, as will be described in greater detail. In contrast, a typical SRAM needs to individually write zeros into each cell, and this may commonly take multiple clock cycles to complete.

Figure 4B:
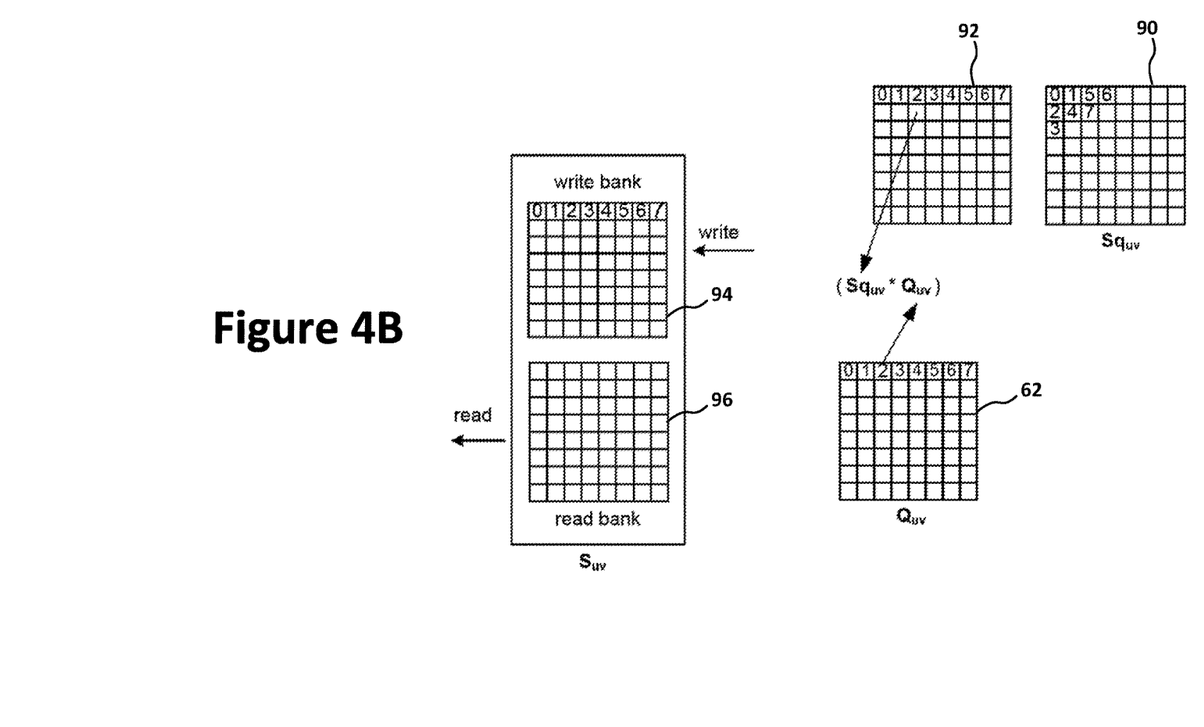
FIG. 4B is a block diagram illustrating storage components and data for use in image processing, according to an example embodiment.

Referring now to FIGS. 4A and 4B, an example image data decoder 70 is illustrated. The decoder 70 is configured to receive encoded image data 54 (such, as the encoded data of FIG. 2A). In the illustrated example, the encoded data is provided immediately to a data decoder 72. The data decoder 72 performs the inverse function of the data encoder 52, e.g., an inverse entropy or Huffman decoding to produce quantized frequency coefficients $Sq_{uv}$. In the example of an 8×8 pixel block, the data decoder 72 is configured to produce between one and sixty-four quantized frequency coefficients $Sq_{uv}$ in a single clock cycle. The number of coefficients $Sq_{uv}$ may depend, in part, on the received encoded image data. In FIG. 4B, in one example, the resulting quantized frequency coefficients $Sq_{uv}$ may be stored in a storage component 90. In another example, a resulting set of one to sixty-four quantized frequency coefficients $Sq_{uv}$ need not be stored separately, but are operated upon in a single operation (e.g., a single clock cycle) by a data inverse sequencer, de-quantizer, and data read/write block, as will be described in more detail hereinafter.

In the present example, the set of one to sixty-four quantized frequency coefficients $Sq_{uv}$ may be arranged in the predetermined sequence resulting from the operation of the data sequencer 48. Accordingly, the quantized frequency coefficients $Sq_{uv}$ are provided immediately to a data inverse sequencer 74, which arranges the quantized frequency coefficients $Sq_{uv}$ in an inverse of the predetermined sequence. Referring to FIG. 4B, in one example, the resulting re-arranged quantized frequency coefficients $Sq_{uv}$ may be stored in a storage component 92.

In another example, the resulting re-arranged quantized frequency coefficients $Sq_{uv}$ need not be stored separately, and after the data inverse sequencer 74, the quantized frequency coefficients $Sq_{uv}$ are provided immediately to a de-quantizer 76, which de-quantizes the quantized frequency coefficients $Sq_{uv}$. In one example, the de-quantizer 76 uses the same quantization table and quantization factor as discussed above in relation to the quantizer 46. However, the de-quantizer 76 multiplies the quantized frequency coefficients $Sq_{uv}$ with corresponding quantization factors $Q_{uv}$ and performs an inverse of the rounding performed by the quantizer 46 to extract the frequency coefficients $S_{uv}$.

In the example of FIG. 4A, a data read/write block 78 writes the frequency coefficients $S_{uv}$ into a "write" storage component or bank. The number of frequency coefficients $S_{uv}$ written by block 78 during a single clock cycle is scalable between one and sixty-four coefficients (e.g., with a 8×8 pixel block) depending upon the processing speed of the components 72, 74, and 76.

Concurrently with the write function, the read/write block 78 may also read or extract the contents of another "read" storage component or bank, and provide the extracted contents to an inverse spatial frequency converter 80. Assuming that the current encoded image data block is not the first data block of the image data that is being processed, the extracted contents of the read storage component include a previously stored or written set of frequency coefficients $S_{uv}$. The inverse spatial frequency converter 80 performs an inverse of the spatial frequency conversion performed by the converter 44 in order to extract the original image data 42 for display, printing, or other processing. The read function of block 78 and the inverse conversion function of converter 80 can be performed, per clock cycle, using a scalable number of previously stored frequency coefficients $S_{uv}$ (e.g., one to sixty-four coefficients) depending on the processing speed of the converter.

FIG. 4B illustrates two storage components 94, 96 that function as the write/read storage banks of the decoder 70. In the present example, each of the storage components 94, 96 is a scalable N×M flip-flop storage structure (N and M being integers). The storage components 90, 92 may also be N×M flip-flop storage structures. The benefits of using flip-flop storage structures in the decoder are the same as described above. More particularly, the flip-flop storage structure is easily (and relatively inexpensively) scalable and can be used to write to and read from any cell of any row simultaneously.

4. Example Operation

Figure 5:
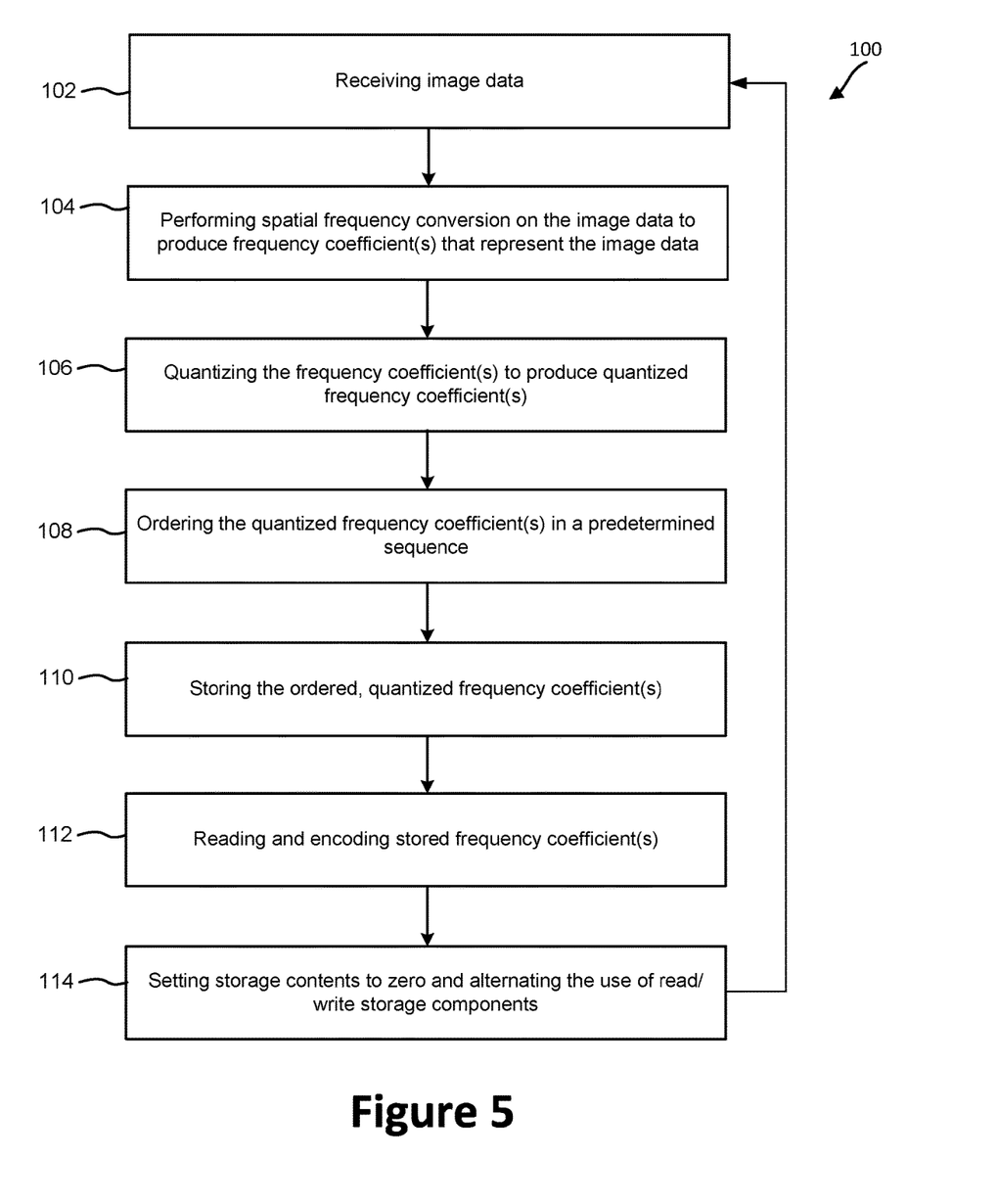
FIG. 5 depicts a method of encoding image data in accordance with an example embodiment.
Figure 6:
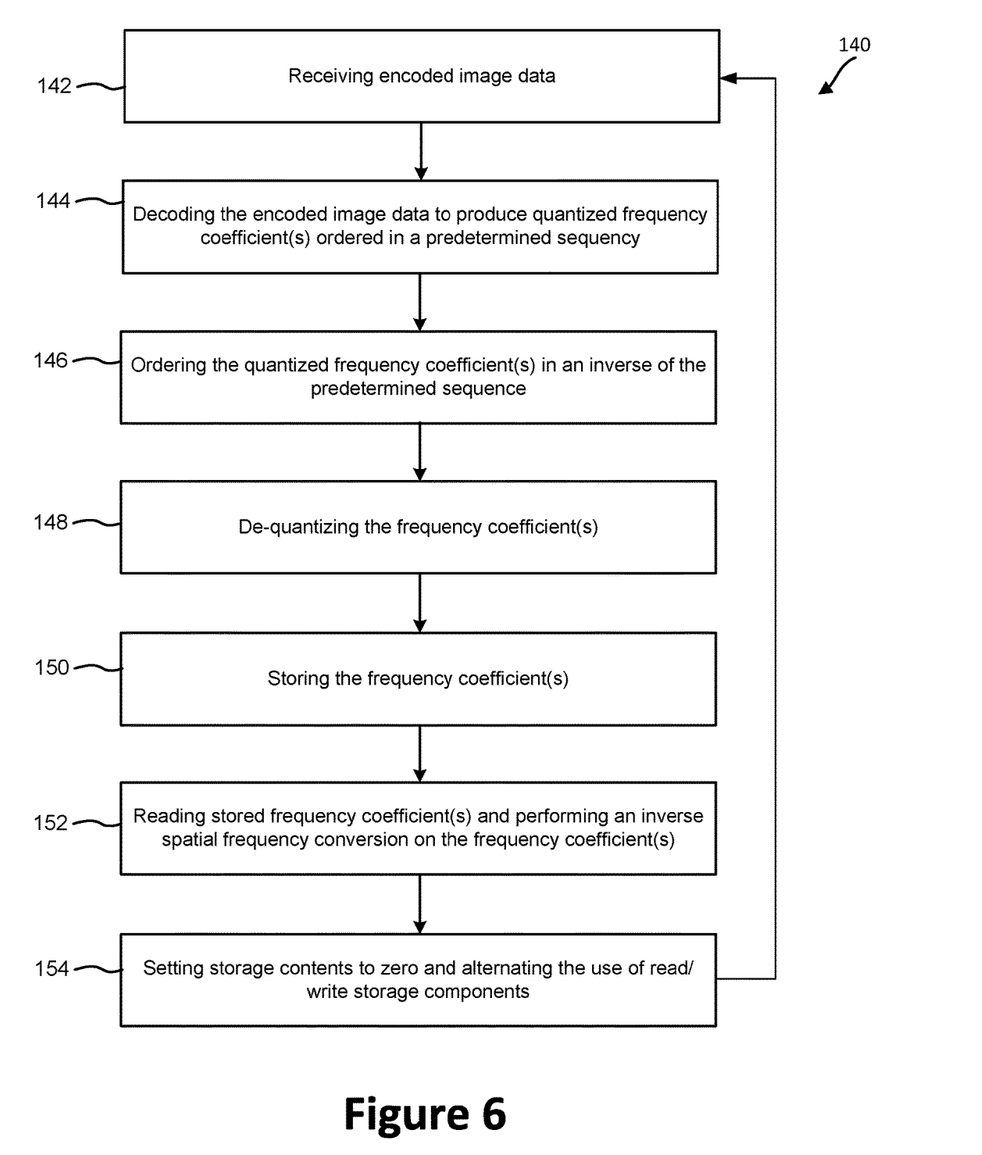
FIG. 6 depicts a method of decoding image data in accordance with an example embodiment.

In addition to the above description, FIGS. 5 and 6 illustrate a flow chart of an example embodiment. The steps illustrated by this flow chart may be carried out by one or more printing devices, such as printing device 20, and/or other computing devices. Further, aspects of each individual step may be distributed between multiple computing devices, as appropriate.

FIG. 5 illustrates an example encoding process 100 that can use the components of FIGS. 2A and 2B, for example. In the process 100, a block 102 receives image data, such as the image data block as shown in FIG. 2A. At block 104, the spatial frequency converter 44 performs spatial frequency conversion, such as by executing DCT on the image data.

As described above, at block 106, the resulting set of one or more frequency coefficients is then operated upon by the quantizer 46 to generate the set of one or more quantized frequency coefficients. Then, at block 108, the data sequencer 48 arranges the set of quantized frequency coefficients in the predetermined sequence (e.g., the zig-zag sequence of FIG. 3).

Following block 108, at block 110, the data read/write block 50 writes the quantized frequency coefficients $Sq_{uv}$ into a "write" storage component or bank. In one example, after the last quantized frequency coefficient $Sq_{uv}$, the data/read/write block 50 adds an end-of-block (EOB) marker, which designates an end of the quantized frequency coefficients $Sq_{uv}$. In the present example, adding the EOB marker means that all the subsequent values in the write storage component are zero. As will be described in more detail hereinafter, the present disclosure sets the contents of a next write storage component to zero during block 114, which facilitates the addition of the EOB marker without requiring subsequent values to be set to zero at block 110.

At block 112, the read/write block 50 reads or extracts the contents of the read storage component or bank, and provides the extracted contents to the data encoder 52. Also at block 112, the data encoder performs entropy or Huffman coding on the extracted, quantized frequency coefficients $Sq_{uv}$ to provide the encoded data 54 for storage, transfer, or other processing. At block 112, when the data encoder 52 encounters an EOB marker, the encoder will stop processing any further data cells, which reduces processing time and improves power efficiency. Although block 112 is illustrated in a sequence after blocks 102-110, in practice, the operations of block 112 may be performed on previously stored quantized frequency coefficients $Sq_{uv}$ simultaneously as another image data block is being processed at blocks 102-110. This configuration enables the parallel processes to be performed more efficiently and quickly.

At block 114, after the quantized frequency coefficients $Sq_{uv}$ are written to the write storage component and the data encoder 52 encodes the extracted quantized frequency coefficients $Sq_{uv}$ from the read storage component, the data read/write block 50, for example, sets the contents of the read storage component to zero. In embodiments where the storage components are flip-flop storage structures, the read/write block 50 (or some other controller) can set all of the contents of the storage structure to zero in a single clock cycle. In contrast, a typical SRAM would need to individually write zeros into each cell, and this process could take multiple clock cycles to complete.

Further, at block 114, the read/write block 50, for example, alternates the use of the read storage component and the write storage component for processing the next image data block. Referring to FIG. 2B for example, during a first data processing period, the storage component 66 functions as the write bank and the storage component 68 functions as the read bank. At block 114, the data read/write block 50 sets each cell of the storage component 68 to zero and, for a subsequent data processing second period, writes a set of quantized frequency coefficients $Sq_{uv}$ corresponding to the next image data block into the storage component 68, and reads the quantized frequency coefficients $Sq_{uv}$ from the storage component 66 for processing by the data encoder 52. Following block 114, control passes back to block 102 and a next image data block can be processed as described above.

The flip-flop data structure of the storage components 66, 68, allows a scalable number of quantized frequency coefficients $Sq_{uv}$ to be written simultaneously (during a single clock cycle) to corresponding cells of the storage components. The flip-flop data structure also allows all of the contents of a storage component to be set to zero during a single clock cycle. This setting of the storage contents to zero is facilitated by the flip-flop data structure and provides computational (and energy) savings by allowing the next set of quantized frequency coefficients $Sq_{uv}$ to be stored in the storage component as soon as the coefficients are calculated.

FIG. 6 illustrates an example decoding process 140 that can use the components of FIGS. 4A and 4B, for example. In the process 140, at block 142, the data decoder 72 receives encoded image data (such, as the encoded data 54 of FIG. 2A). At block 144, the decoder 72 performs the inverse function of the data encoder 52 to produce quantized frequency coefficients $Sq_{uv}$.

As described above, at block 146, the data sequencer 74 arranges the quantized frequency coefficients $Sq_{uv}$ in an inverse of the predetermined sequence. Then, at block 148, the de-quantizer 76 de-quantizes the quantized frequency coefficients $Sq_{uv}$ to provide the frequency coefficients $S_{uv}$. At block 148, when the de-quantizer 76 encounters an EOB marker, the de-quantizer will stop further data processing, which reduces processing time and improves power efficiency. Then, at block 150, the data read/write block 78 writes the frequency coefficients $S_{uv}$ into the write storage component.

At block 152, the read/write block 78 reads or extracts the contents of the read storage component, and provides the extracted frequency coefficients $S_{uv}$ to the inverse spatial frequency converter 80. The inverse spatial frequency converter 80 performs an inverse of the spatial frequency conversion performed by the converter 44 in order to extract the original image data 42 for display, printing, or other processing. Although block 152 is illustrated in a sequence after blocks 142-150, in practice, the operations of block 152 may be performed on previously stored frequency coefficients $S_{uv}$ simultaneously as another encoded image data block is being processed at blocks 142-150. This configuration enables the parallel processes to be performed more efficiently.

At block 154, after the frequency coefficients $S_{uv}$ are written to the write storage component and the converter 80 converts the extracted frequency coefficients $S_{uv}$ from the read storage component, the data read/write block 78, for example, sets the contents of the read storage component to zero and alternates the use of the read storage component and the write storage component for processing the next encoded image data block. In embodiments where the storage components are flip-flop storage structures, the read/write block 78 (or some other controller) can set all of the contents of the storage structure to zero in a single clock cycle. In contrast, a typical SRAM would need to individually write zeros into each cell, and this process could take multiple clock cycles to complete.

Referring to FIG. 4B for example, during a first data processing period, the storage component 94 functions as the write bank and the storage component 96 functions as the read bank. At block 154, the data read/write block 78 sets each cell of the storage component 96 to zero and, for a subsequent data processing second period, writes a set of frequency coefficients $S_{uv}$ corresponding to the next encoded image data block into the storage component 96, and reads the frequency coefficients $S_{uv}$ from the storage component 94 for processing by the converter 80. Following block 154, control passes back to block 142 and a next encoded image data block can be processed as described above.

5. Example Flip-Flop Storage Component

Referring now to FIG. 7, an example 2×2 flip-flop memory bank structure 200 is illustrated. In FIG. 7, four flip-flop memory elements W, X, Y, and Z are illustrated. The memory bank structure 200 can be scaled up or down to include any number of desired data rows and columns, such as by adding additional flip-flop memory elements to scale the memory bank up to an 8×8, as shown in FIGS. 2B and 4B.

In FIG. 7, the memory bank 200 includes a clock input C that is used to trigger a storage function of each flip-flop memory element. For instance, a rising edge of the clock input C can trigger the storage function.

The memory bank 200 also includes a Switch/Reset signal. In one example embodiment, at the rising edge of the clock input C, regardless of any other inputs, the current data Q stored in any desired flip-flop memory element may be set to a state of logic zero. As described above, the Switch/Reset signal input can be common to all of the flip-flop storage elements, such that during initialization or when there is a reset command, the Switch/Reset signal input will be set to logic 1, and following the rising edge of the clock input C, all the contents of the storage elements will be set to logic zero.

Further, the memory bank 200 includes an Enable signal. In one example, at the rising edge of the clock input C, and if the Switch/Reset signal is logic zero, the Enable signal being logic one will cause the data content input D to be stored in each respective flip-flop storage element. The output Q will then indicate the current data stored in each respective flip-flop storage element. All outputs are available for use (can be read) and can be selected by blocks or components that require read data, such as the data encoder 52 and the inverse spatial frequency converter 80 in the examples of FIGS. 2A and 4A, respectively.

In addition, the memory bank 200 includes a Data Select module that is coupled to the data content input D of each flip-flop storage element. The Data Select module receives a Select signal that identifies which data (Data0, Data1, Data2, Data3, in the present example) that is to be selected as the data input D of a corresponding flip-flop storage element.

FIG. 7 also includes a Write Address Decoder module that functions to select which flip-flop storage element is to be updated and with what data content. For example, if the Write_Address_0 "points" to flip-flop Y, the Write Address Decoder module will generate an Enable Y signal and a Data Select Y signal to choose the Write_Data_0 to be updated. Write_Address_1 will point to another flip-flop storage element and so on. Since each pixel occupies a specific location in an 8×8 structure, this configuration does not have address collisions, because the same flip-flop storage element will not be pointed to by more than one Write_Address_N of the Write Address Decoder module, and allows multiple data to be written in a single clock cycle. This is another potential benefit over known JPEG decoding processes that commonly use an SRAM storage component.

The Write Address Decoder module can be scaled, as desired, to one or more write ports to enable storage of any number of data cells in a single clock cycle. For instance, in JPEG image processing a common image data block is an 8×8 pixel block that potentially includes 64 corresponding data cells. The Write Address Decoder can be scaled from 1 to 64 write ports, and thus write to 64 different storage cells in a single clock cycle.

6. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for processing image data comprising:
during a first period consisting of a single clock cycle, performing, at a processor on a printing device, an inverse spatial frequency conversion on contents of a first flip-flop storage component to produce first image data, wherein the contents of the first flip-flop storage component include a first set of one or more frequency coefficients that represent a spatial frequency conversion of the first image data;

during the first period, storing, by the processor on the printing device, a second set of one or more frequency coefficients in a second flip-flop storage component, wherein the second set of one or more frequency coefficients represent a spatial frequency conversion of second image data;

after performing an inverse spatial frequency conversion on contents of the first flip-flop storage component and storing the second set of one or more frequency coefficients in the second flip-flop storage component, setting, by the processor on the printing device, a plurality of the contents of the first flip-flop storage component to zero;

during a second period after the first period, the second period consisting of a single clock cycle, performing, at the processor on the printing device, inverse spatial frequency conversion on contents of the second flip-flop storage component to produce the second image data, wherein the contents of the second flip-flop storage component include the second set of one or more frequency coefficients stored during the first period; and during the second period, storing, at the processor on the printing device, a third set of one or more frequency coefficients in the first flip-flop storage component, wherein the third set of one or more frequency coefficients represent a spatial frequency conversion of third image data.

2. The method of claim 1 further comprising, during a third period before the first period, storing the first set of one or more frequency coefficients in the first flip-flop storage component, and wherein storing the first set of one or more frequency coefficients during the third period further includes:

receiving a first set of one or more quantized frequency coefficients that are ordered in a predetermined sequence;

ordering the first set of one or more quantized frequency coefficients in an inverse predetermined sequence;

de-quantizing the first set of one or more quantized frequency coefficients to produce the first set of one or more frequency coefficients; and storing the first set of one or more frequency coefficients in the first flip-flop storage component.

3. The method of claim 2, wherein storing the second set of one or more frequency coefficients during the first period includes:

receiving a second set of one or more quantized frequency coefficients that are ordered in a predetermined sequence;

ordering the second set of one or more quantized frequency coefficients in an inverse predetermined sequence;

de-quantizing the second set of one or more quantized frequency coefficients to produce the second set of one or more frequency coefficients; and storing the second set of one or more frequency coefficients in the second flip-flop storage component.

4. The method of claim 3, further comprising:

during the third period, receiving first encoded data corresponding to the first image data, and decoding the first encoded data to provide the first set of one or more quantized frequency coefficients that are ordered in the predetermined sequence; and during the first period, receiving second encoded data corresponding to the second image data, and decoding the second encoded data to provide the second set of one or more quantized frequency coefficients that are ordered in the predetermined sequence.

5. The method of claim 2, further comprising, during the third period, de-quantizing a plurality of quantized frequency coefficients in a single clock cycle to produce at least part of the first set of one or more frequency coefficients.

6. The method of claim 1, wherein performing the inverse spatial frequency conversion during the first period is stopped when an end-of-block marker is encountered in the contents of the first flip-flop storage component.

7. An image processing system comprising:

a first flip-flop bank and a second flip-flop bank; and a control system for an image forming apparatus, the control system comprising at least a processor and configured to control JPEG processing of image data, wherein the control system is further configured to:

during a first period, consisting of a single clock cycle, perform an inverse spatial frequency conversion on contents of the first flip-flop bank to produce first image data, wherein the contents of the first flip-flop bank include a first set of one or more frequency coefficients that represent a spatial frequency conversion of the first image data;

during the first period, store a second set of one or more frequency coefficients in the second flip-flop bank, wherein the second set of one or more frequency coefficients represent a spatial frequency conversion of second image data;

after performing an inverse spatial frequency conversion on contents of the first flip-flop bank and storing the second set of one or more frequency coefficients in the second flip-flop bank, set the contents of the first flip-flop bank to zero;

during a second period after the first period, the second period consisting of a single clock cycle, perform inverse spatial frequency conversion on contents of the second flip-flop bank to produce the second image data, wherein the contents of the second flip-flop bank include the second set of one or more frequency coefficients stored during the first period; and during the second period, store a third set of one or more frequency coefficients in the first flip-flop bank, wherein the third set of one or more frequency coefficients represent a spatial frequency conversion of third image data.

8. The system of claim 7, wherein the control system is further configured to:

use a respective flip-flop bank as the read bank by providing contents of the read bank to a coding component that is configured to produce first encoded data for a first sample of the image data, wherein the contents of the read bank include a first set of one or more quantized frequency coefficients that correspond to the first sample of the image data and that are ordered in a predetermined sequence; and use a respective flip-flop bank as the write bank by storing a second set of one or more quantized frequency coefficients that are ordered in a predetermined sequence in the write bank, wherein the second set of one or more quantized frequency coefficients correspond to a second sample of the image data.

9. The system of claim 7, further comprising a spatial frequency conversion component configured to perform spatial frequency conversion on received image data to produce sets of one or more frequency coefficients, wherein a set of one or more frequency coefficients represents the spatial frequency conversion of a respective sample block of the received image data;

a quantizing component configured to quantize the sets of one or more frequency coefficients to produce sets of one or more quantized frequency coefficients;

a sequencing component configured to order the sets of one or more quantized frequency coefficients in a predetermined sequence, wherein the control system is configured to use a respective flip-flop bank as the write bank by storing, in the write bank, a first set of one or more quantized frequency coefficients that are ordered in the predetermined sequence; and a coding component configured to encode contents of the read bank to produce encoded data for the received image data, wherein the contents of the read bank include a second set of one or more quantized frequency coefficients ordered in a predetermined sequence.

10. The system of claim 9, wherein the spatial frequency conversion component configured to perform a discrete cosine transfer conversion, and the coding component is configured to perform entropy encoding of the contents of the read back to produce the encoded data.

11. The system of claim 7, wherein the control system is further configured to:

use a respective flip-flop bank as the read bank by providing contents of the read bank to an inverse spatial frequency conversion component that is configured to perform inverse spatial frequency conversion on the contents of the read bank to produce a first sample block of the image data, wherein the contents of the read bank include a first set of one or more frequency coefficients that correspond to the first sample block of the image data; and use a respective flip-flop bank as the write bank by storing a second set of one or more frequency coefficients in the write bank, wherein the second set of one or more frequency coefficients corresponds to a second sample block of the image data.

12. The system of claim 7, further comprising a decoding component configured to decode received encoded data corresponding to samples of the image data and to provide sets of one or more quantized frequency coefficients that are ordered in a predetermined sequence;

a sequencing component configured to order the sets of one or more quantized frequency coefficients received from an entropy decoding component in an inverse predetermined sequence;

a de-quantizing component configured to de-quantize the sets of one or more quantized frequency coefficients received from the sequencing component to provide sets of one or more frequency coefficients, wherein the control system is further configured to use a respective flip-flop bank as the write bank by storing, in the write bank, a first set of one or more frequency coefficients; and an inverse spatial frequency conversion component configured to perform inverse spatial frequency conversion on contents of the read bank to produce image data, wherein the contents of the read bank include a second set of one or more frequency coefficients.

13. The system of claim 7, wherein the first flip-flop bank, the second flip-flop bank, and the control system are included in a printing device.

* * * * *